United States Patent [19]

Kondo

[11] Patent Number: 4,765,213
[45] Date of Patent: Aug. 23, 1988

[54] CROOKED CUT DETECTING SYSTEM APPLICABLE TO A SAWING MACHINE

[75] Inventor: Mitsuo Kondo, Kawanishi, Japan

[73] Assignee: Daito Seiki Company Limited, Osaka, Japan

[21] Appl. No.: 127,789

[22] Filed: Dec. 2, 1987

[30] Foreign Application Priority Data

Dec. 5, 1986 [JP] Japan ................................ 61-291261

[51] Int. Cl.$^4$ ........................................... B23Q 15/20
[52] U.S. Cl. ........................................... 83/61; 83/63; 83/71; 83/102; 83/789
[58] Field of Search ................... 83/61, 63, 66, 67, 71, 83/73, 102, 359, 358, 789

[56] References Cited

U.S. PATENT DOCUMENTS 4,355,555 10/1982 Kobayashi et al. ................ 83/789 X

FOREIGN PATENT DOCUMENTS 55-42722 3/1980 Japan ..................................... 83/63

Primary Examiner—Frank T. Yost
Attorney, Agent, or Firm—Koda and Androlia

[57] ABSTRACT

A crooked cut detecting system consisting fundamentally of a sensor for sensing irregularities developed on a cut end of a material from which a section was cut away by a sawing machine, an arithmetic means for deriving as a developed crookedness the difference between the maximum and minimum values of the above irregularities, and a comparator to compare the developed crookedness with a standard value defining a maximum allowable crookedness. The operations of the above fundamental constituents are computerized so as to be incorporated in the operation of an ordinary automatic sawing machine, whereby successive irregular cutting operations of an automatic sawing machine can be eliminated.

6 Claims, 5 Drawing Sheets

CROOKED CUT DETECTING SYSTEM APPLICABLE TO A SAWING MACHINE

BACKGROUND OF THE INVENTION

The present invention relates to a system for detecting crookedness developed on the cut end surface of a material from which a section was cut away by a sawing machine.

The advance of computerized control systems has come to enable a sawing machine to operate automatically, including successive feeding of materials to the sawing machine and automatic disposition of the sections cut away from the materials. However, abrasion of the saw teeth or an excessive saw feeding speed may cause the saw blade to be warped, resulting in crookedness on the cut-off cross-sectional surfaces of a material from which a section was cut away. Once a crooked cut comes to take place, all the sections subsequently cut away have their cut ends warped lacking the precision of cutting, unless the saw blade is replaced with a new one, or the cutting condition is altered. The crooked cut is a major hindrance to an unattended complete automatization of the sawing machine.

The crooked cut itself may well be detected, for instance, by observing the band saw be distorted causing a crooked cut, as has been so far proposed. However, such conventional methods of detecting a crooked cut are accompanied by a large error causing the detection to be unreliable and unpractical.

OBJECTS AND SUMMARY OF THE INVENTION

An object of the present invention is to provide a crooked cut detecting system capable of precisely detecting a cut end surface warp arising in the process of cutting a material.

Another object of the present invention is to constitute such a crooked cut detecting system so as to be capable of being incorporated in an automatic sawing machine such as of a band saw type, whereby an unattended completely auotmated sawing system is made free from fear that, in a process of automatic operation, inaccurate cutting may be caused by the crooked cut.

To achieve the above objects, the crooked cut detecting system according to the present invention has a basic constitution as illustrated in FIG. 1. A surface warp sensor 14 is of an optical type devised so as to detect the distance between the same and a cut end surface F of a material M from which a section m was cut away by a sawing machine (not shown). After the section is cut away, the sensor 14 is fed by a sensor feeding means 5a into a space S made in front of the cut end surface F of the material M with the same made to retrogress by a material displacing means 16b. In the process of being fed into the space S the sensor 14 outputs a continuous distance signal reflecting the distance between the sensor 14 and the cut end surface F. The distance signal is processed by an arithmetic means 20b so as to give a max-min difference signal proportional to the difference between the maximum and the minimum values of the distance signal. The max-min difference signal, which is taken as an indicator of the warp developed on the cut end surface F, is compared by a comparator 20c with a standard signal defining a maximum allowable warp. If the output from the comparator 20c indicates that the max-min difference signal exceeds the standard signal, it is judged that an unallowable warp is developed on the cut end surface F of the material M, and therefore, also on the cut end of the cut section m. The above means 5a, 16b and 20c are controlled by a control means 20a.

The above described fundamental function of the present invention can easily be extended so as to be applied to an automatic sawing machine to interrupt the cutting operation when an unallowable warp takes place. For the purpose it is enough only to additionally provide a device which outputs an alarm signal. This alarm signal is supplied to the operation sequence of the automatic sawing machine and used to stop the further operation of the machine.

Thus the present invention enables an automatic sawing machine to be free, if unattended, from the irregular cutting of a material. After a necessary countermeasure such as replacement of the saw blade or readjustment of the downward saw feeding speed has been taken during the stoppage of the machine, the cutting operation can be recommenced.

DETAILED DESCRIPTION OF THE INVENTION

Figure 1:
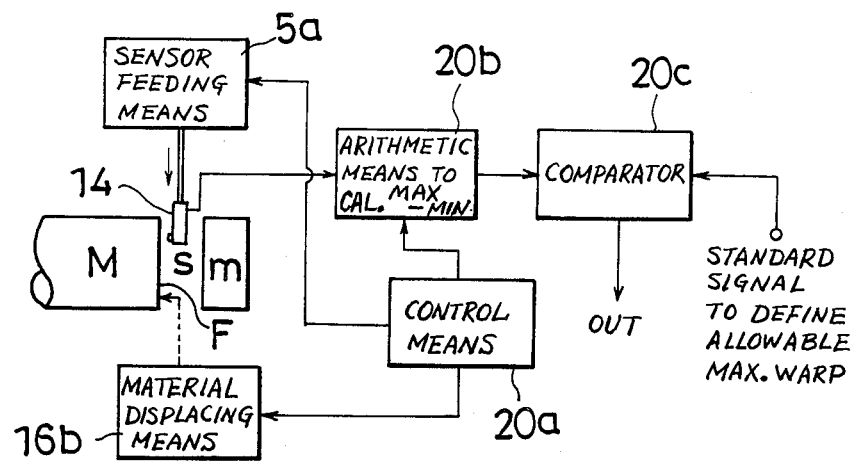
FIG. 1 shows the fundamental constitution of the present invention block-diagrmmatically.
Figure 3:
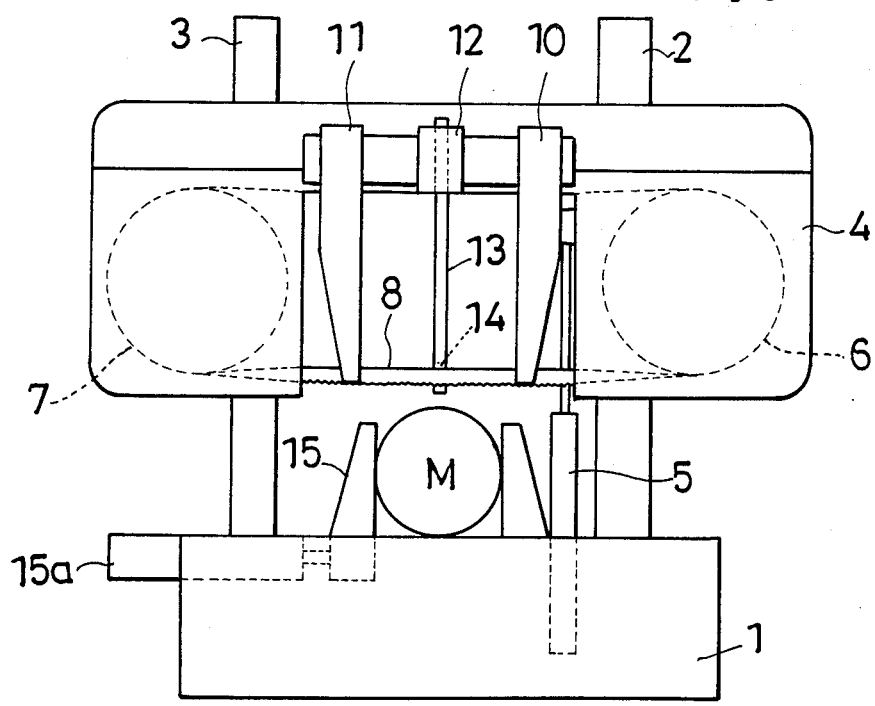
FIG. 3 shows a frontal view of the automatic sawing machine whose plan view is shown in FIG. 2.
Figure 2:
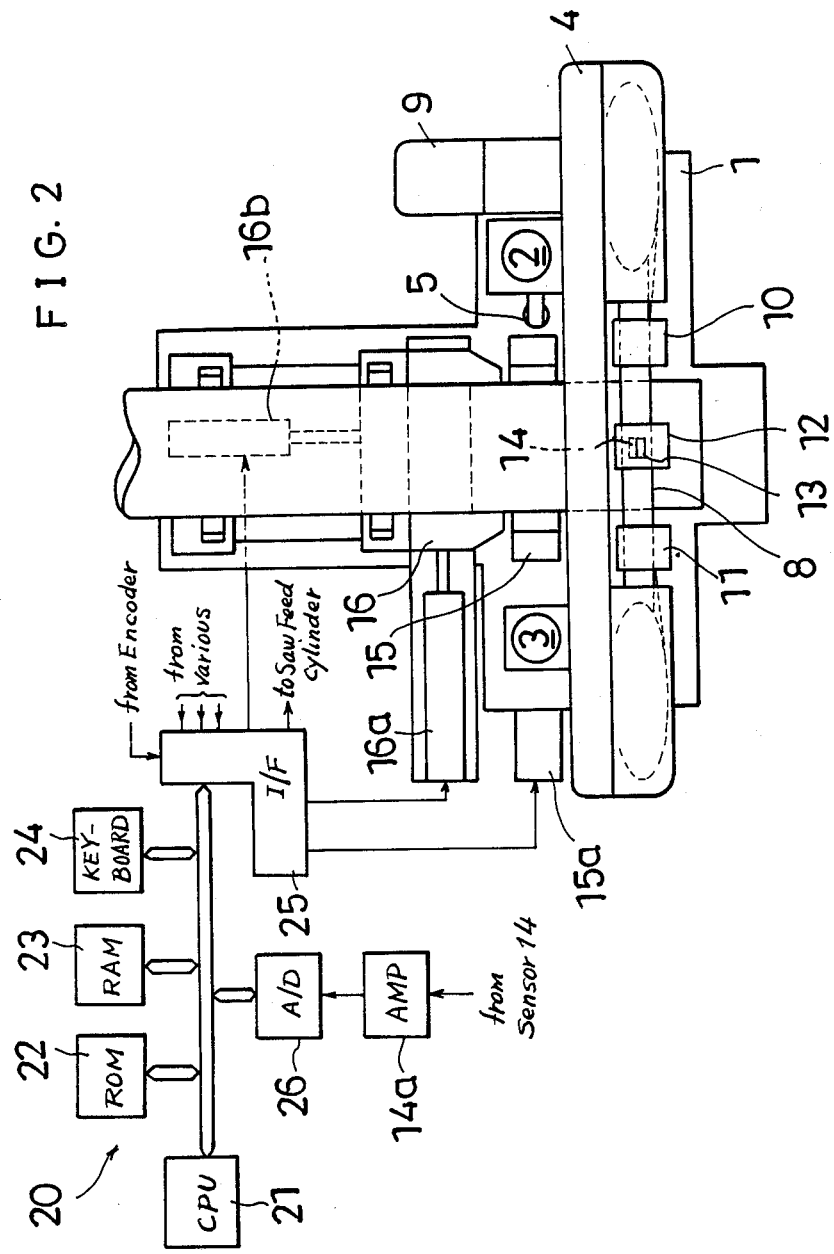
FIG. 2 shows a plan view of an automatic sawing machine to which an embodiment of the present invention is applied, the plan view being accompanied by a block-diagram representing the electronic system to control the embodiment in conjunction with the above automatic sawing machine.

The present invention is described in further detail on reference to FIGS. 2 to 5, of which FIGS. 2 and 3 show respectively the plan view and frontal view of an automatic sawing machine to which is applied an embodiment of the crooked cut detecting system according to the present invention. However, the plan view in FIG. 2 is accompanied by a block-diadrammatically represented electronic control system for the entire apparatus.

Referring to FIGS. 2 and 3, a saw frame 4 is driven up and down by a saw feed hydraulic cylinder 5, being guided by a main column 2 and a sub-column 3 extending upward from a bed 1. The upper and the lower limits of feeding are determined by an upper and a lower limit switches (not shown), respectively. In the saw frame 4 there is provided a pair of saw wheels 6 and 7 separated bilaterally. An endless band saw blade 8, spanned between the saw wheels 6 and 7, is driven by a motor 9.

The saw frame 4 is provided with a pair of saw guides 10 and 11, which distort and guide the band saw balde 8 so that the same may run with the band face kept directed vertically. Between the saw guides 10 and 11 is located a sensor support guide 12, which slidably guides a sensor support 13 having a surface warp sensor 14 on the lower end behind the saw blade 8. the surface warp sensor 14 is of a non-contact type, for example, made of a photosensor making use of a laser beam reflection. The sensor 14 detects the distance between the same and an object (the cut end surface of a material from which a section was cut away).

On the bed 1 there are installed a main vise 15 and an index vise 16 positioned at the rear of the main vise 15. The clamping-and-releasing action of the main vise 15 is effected by a main-vise actuating hydraulic cylinder 15a, while the index vise 16 is not only actuated by an index-vise actuating hydraulic cylinder 16a but also drawn progressively to and retrogressively from the main vise 15 by an index-vise displacing hydraulic cylinder 16b. The displacement of the index vise 16 is detected by a not shown mechanism made up of a rotary encoder combined with a rack-and-pinion. The arrival of the index vise 16 at its progressing end is detected by a not shown progress limit switch.

An electronic control system 20, which is computerized, comprises a CPU 21 to control the execution of stored program and the operation of objective instruments concerned, ROM 22 to store a program specifying the function of the sawing machine to which the present invention is applied, a RAM 23 having areas to store data signals from the surface warp sensor 14 and below-mentioned warp limit value, a keyboard 24 to input said warp limit value and other data, and an interface 25 connecting the control system with objective instruments concerned.

In addition to the above briefed constitution, the electronic control system 20 is accompanied by an A-D converter 26, through which is inputted thereto the distance signal outputted from the surface warp sensor 14, being amplified by an amplifier 14a. On the other hand, the signals from the previously mentioned various switching means and encoder, namely, the upper and lower limit switches (not shown) defining the stroke of the saw frame movement, the progress limit switch (not shown) for the index vise 16 and the rotary encoder (not shown) for detecting the displacement of the index vise 16, are inputted through the interface 25. To the contrary the electronic control system 20 outputs, through the same interface 25, the signals to operate the saw feed cylinder 5, the main-vise actuating cylinder 15a, the index-vise actuating cylinder 16a and the index-vise displacing cylinder 16b.

Figure 4:
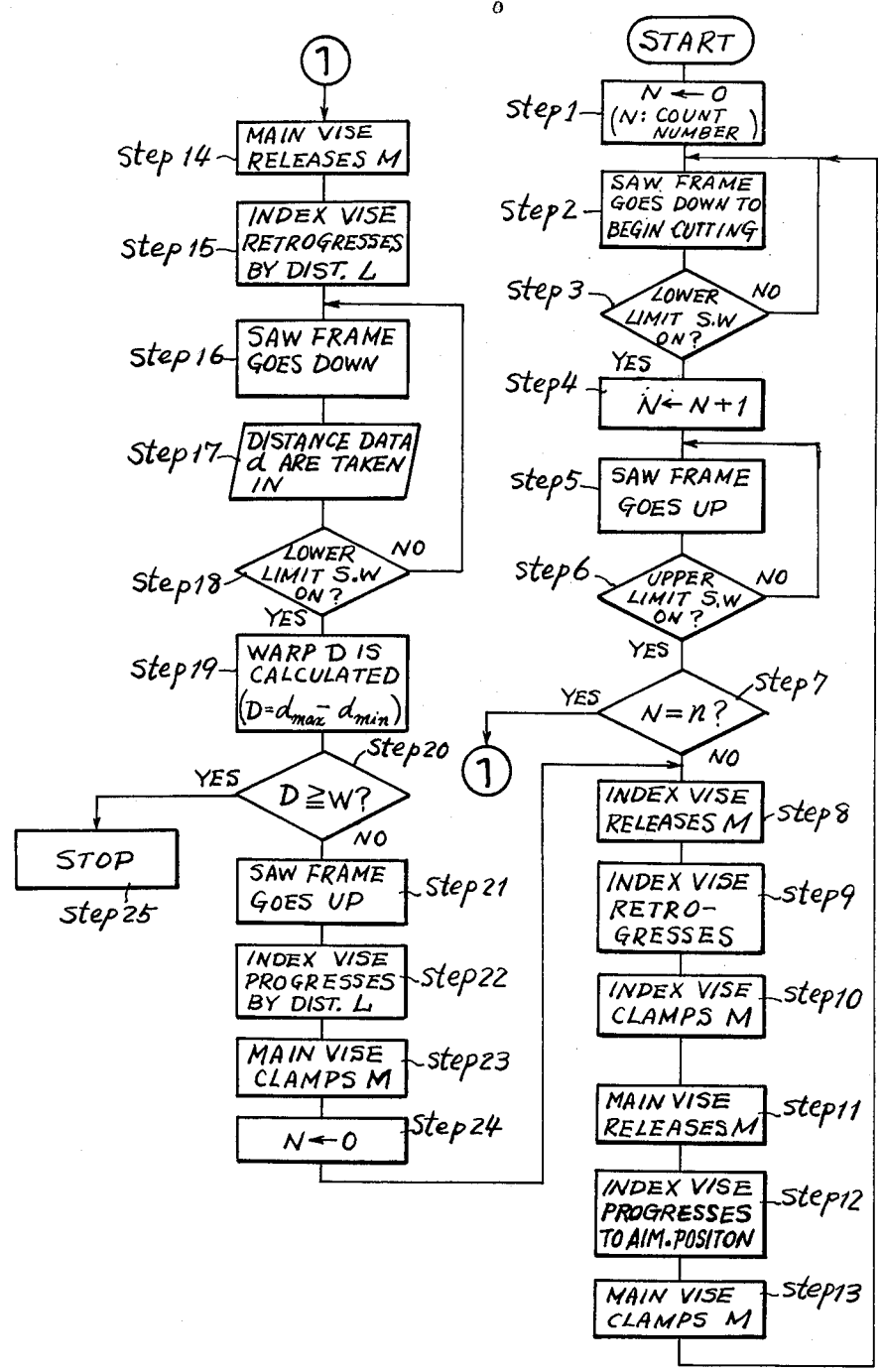
FIG. 4 shows a flow chart representing the program stored in the ROM of the electronic control system shown in FIG. 2.
Figure 5:
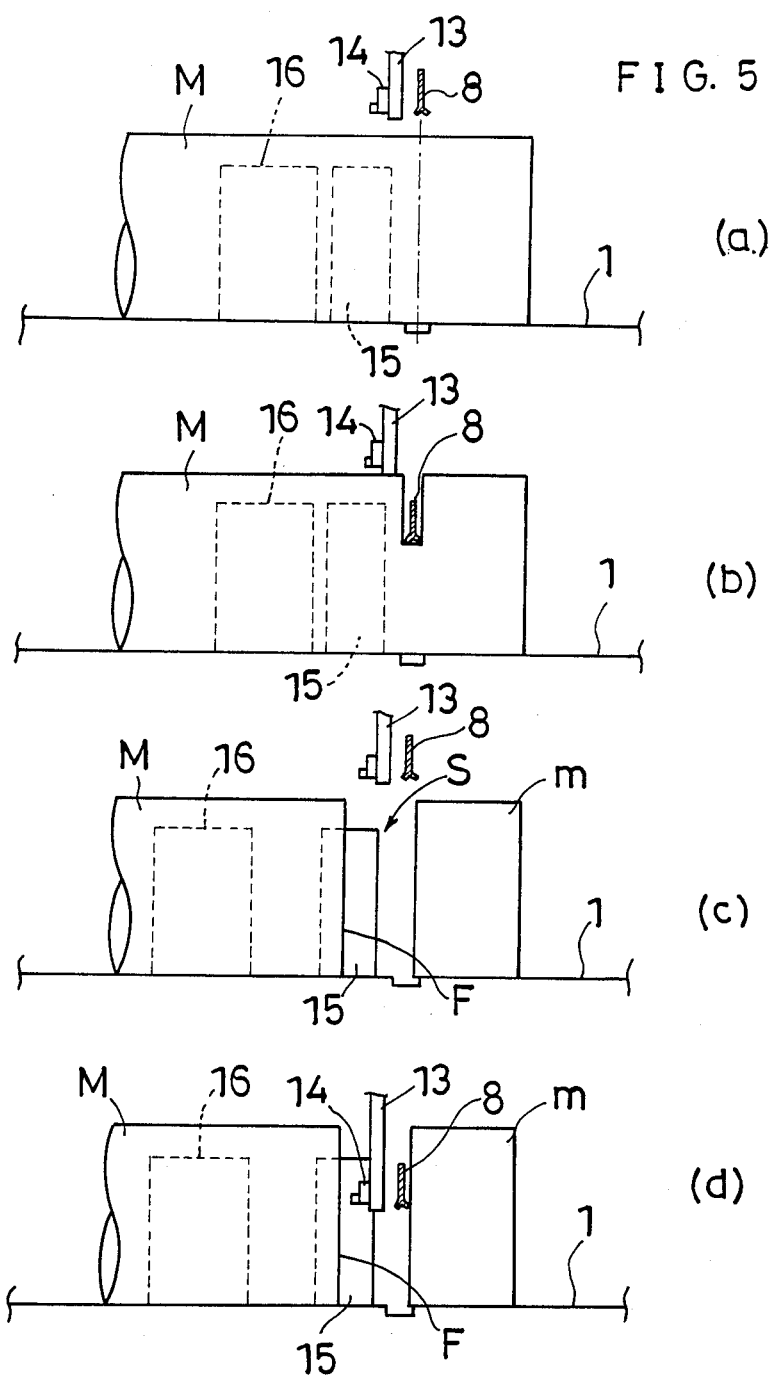
FIGS. 5a–d illustrate the function of the above embodiment of the present invention.

The operation of the automatic band sawing machine to which the present invention is applied is described in the following on reference to FIGS. 4 and 5. FIG. 4 shows the flow chart representing a program stored in the ROM 22, while FIG. 5 illustrates the movement of the surface warp sensor 14 employed in an embodiment of the present invention.

In advance of starting the operation it is necessary to set both a warp limit value D defining a maximum allowable warp of the cut end surface of the material and a value temporarily named "warp detection interval number n", which indicates the number of cutting operations to be successively made without detecting a crooked cut between two warp detection operations.

With an instruction to start operation, a counter constructed within the RAM 23 is reset at step 1 to make the count number N be zero, and then the saw frame 4 goes down to begin cutting the material M with the surface warp sensor 14 left on the material M. The situation at this stage is illustrated in FIG. 5(b). While only the saw blade 8 is further going down cutting the material M, the sensor support 13 is sliding in the sensor support guide 12. When the saw frame 4 reaches the lower limit, namely, when a cutting operation is completed, the count number N is increased by one (step 4), and the saw frame 4 is made to go up (step 5), being caused by the signal from the lower limit switch (not shown). Halfway in the course of moving upward the saw frame 4 comes to take away upward the surface warp sensor 14 having so far stayed on the material M. Then arriving at the upper limit, the saw frame 4 is made to stop there by the signal from the upper limit switch (not shown). Thus the situation returns to the original state as illustrated in FIG. 5(a).

While the number of such cutting operations, that is, the count number N is judged, at step 7, not to reach the warp detection interval number n, the process is returned to step 2 through steps 8 to 13 to repeat the similar cutting operation. The operations of the main vise 15 and the index vise 16 through steps 8 to 13 are common to those in a usual automatic sawing machine, as is briefed in the flow chart, and therefore the detail description is omitted. Incidentally, the stroke of the retrogressing and progressing movement (at steps 8 and 12, respectively) of the index vise 16 is controlled by the coincidence of a preset value set in advance by the keyboard 24 with the output signal from the previously mentioned rotary encoder (not shown) for detecting the displacement of the index vise 16.

Once the count number N increased to the warp detection interval number n, step 7 is followed by a series of steps 14 to 19 to examine if a crookedness is developed on the cut end surface F of the material M. At step 14 the main vise 15 releases the material M, and then the index vise 16, which still clamps the material M, retrogressed by a predetermined distance L at step 15 to provide, in front of the cut end surface F of the material M, a space S to make it possible to insert there the surface warp sensor 14. The situation at this stage is illustrated in FIGS. 5(c) and 5(d). As the saw frame 4 is made to go down (step 16), the surface warp sensor 14 also goes down in front of the cut end surface F of the material M without getting in touch with the material M. In the course of going down, the surface warp sensor 14 continues to measure the distance from the cut end surface F, outputting distance data d.

The distance data d are amplified by the amplifier 14a and digitalized by the A-D converter 26, and then read in by the RAM 23 at step 17 until the saw frame 4 reaches the lower limit switch (refer to step 18) and stops there. Then step 18 is followed by step 19, where a warp D developed on the cut end surface F is calicurated, as the difference between a maximum distance $d_{max}$ and a minimum distance $d_{min}$, both the maximum and the minimum distances ($d_{max}$ and $d_{min}$) being selected from the distance data read in step 17. The thus detected surface warp D is compared with the previously set value W indicating a maximum allowable warp. If the surface warp D is judged, at step 20, not to exceed the value W (representing a maximum allowable warp), step 20 is followed by step 21, where the saw frame 4 is made to go up to make it possible for the index vise 16 to progress again by the distance L (step 22) in order to return the cut end surface F of the material M to the original position. After the main vise 15 clamps the material (step 23) and the count number N is reset to zero at step 24, the process is directed to step 8 to repeat the previously mentioned usual automatic cutting operation.

However, if the detected surface warp D is judged, at step 20, to have exceeded the maximum allowable warp W, the entire automatic cutting system is made to stop at step 25, to make it possible to take the countermeasures necessary to eliminate the development of a crooked cut.

Figure 6:
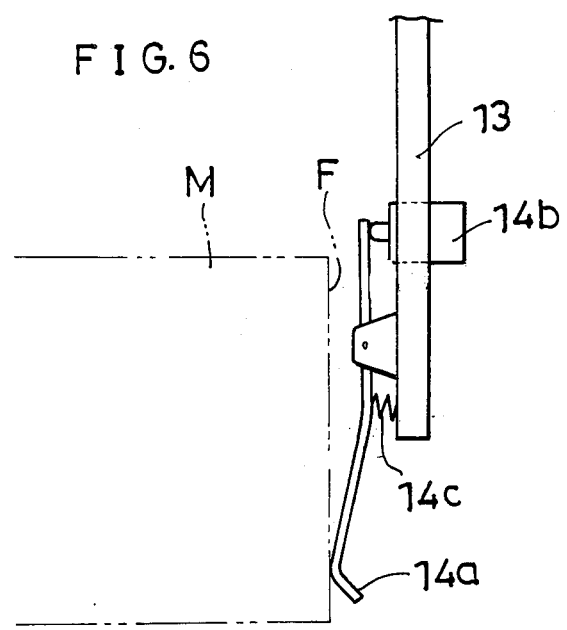
FIG. 6 shows a contact type surface warp sensor used in a modified embodiment of the present invention.

The above embodiment described in the state that it is applied to an automatic sawing machine can be modified by replacing the non-contact type surface warp sensor 14 with a contact type sensor consisting of a differential transformer and a probe lever, both being fixed to the sensor support 13, as shown in FIG. 6. According to FIG. 6, a probe lever 14a, which is made to contact with the cut end surface F of a material M by means of a spring 14c, mechanically taransmits the crookedness of the cut end surface F to a differential transformer 14b in contact with the upper end of the probe lever 14a. Thus the differential transformer 14b outputs an electric signal reflecting the warp of the cut end surface F. This modification can be further modified by substituting any other suitable force transducers for the above differential transformer 14b.

Figure 7:
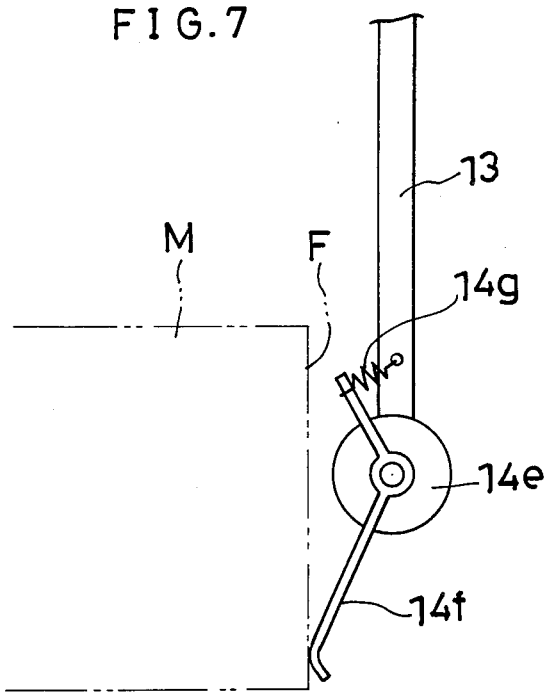
FIG. 7 shows another contact type surface warp sensor used in another embodiment of the present invention.

In addition the present invention can be embodied also by using as the warp sensor a rotary encoder as shown in FIG. 7. In this embodiment a rotary encoder 14e has a probe lever which is made to contact with the cut end surface F of a material M by means of a spring 14g. According to this surface warp sensor, the warp developed on the cut end surface of the material M is detected as the rotation of the rotary encoder 14e.

What is claimed is:

1. A crooked cut detecting system for detecting a warp developed on a cut end surface of a material from which a section was cut away by a sawing machine, said crooked cut detecting system comprising:
   a material displacing means for displacing a material after a section has been cut away from said material by a sawing machine, thereby providing a sensor inserting space in front of the cut end of said material;
   a surface warp sensor to detect the warp of a cut end surface of said material;
   a surface warp sensor feeding means for feeding said surface warp sensor into said sensor inserting space along a line parallel to a plane in which the cut end surface of said section is expected to lie;
   a difference signal outputting means for outputting a difference signal by calculating the difference between the maximum and the minimum values of the signal outputted from said surface warp sensor while the same is being fed into said sensor inserting space;
   a comparator to compare said difference signal with a predetermined value for the purpose of outputting a crooked cut alarm signal when the value of said difference signal exceeds said predetermined value; and
   a control means for controlling the operations of said material displacing means, said surface warp sensor feeding means, said difference signal outputting means and said sensor.

2. A crooked cut detecting system defined in claim 1, wherein said surface warp sensor is a non-contact type distance detecting sensor devised so as to detect the distance between said distance detecting sensor and a cut end surface of a material by making use of a light beam reflection.

3. A crooked cut detecting system define in claim 1, wherein said surface warp sensor is a contact type crookedness detecting sensor consisting of a probe lever and a force transducer, said probe lever being in contact with a cut end surface of a material to transmit the crookedness of said cut end surface to said force transducer.

4. A crooked cut detecting system defined in claim 3, wherein said force transducer is a differential transformer.

5. A crooked cut detecting system defined in claim 1, wherein said surface warp sensor is a contact type crookedness detecting sensor consisting of a probe lever and rotary encoder, said probe lever in contact with a cut end surface of a material to transmit the crookedness of said cut end to said rotary encoder.

6. A crooked cut detecting system defined in claim 1, 2, 3, 4 or 5, wherein a means for interrupting cutting operation in accordance with said crooked cut alarm signal is provided for the purpose of making said crooked cut detecting system applicable to an automatic sawing machine.

* * * * *